Patented Nov. 4, 1952

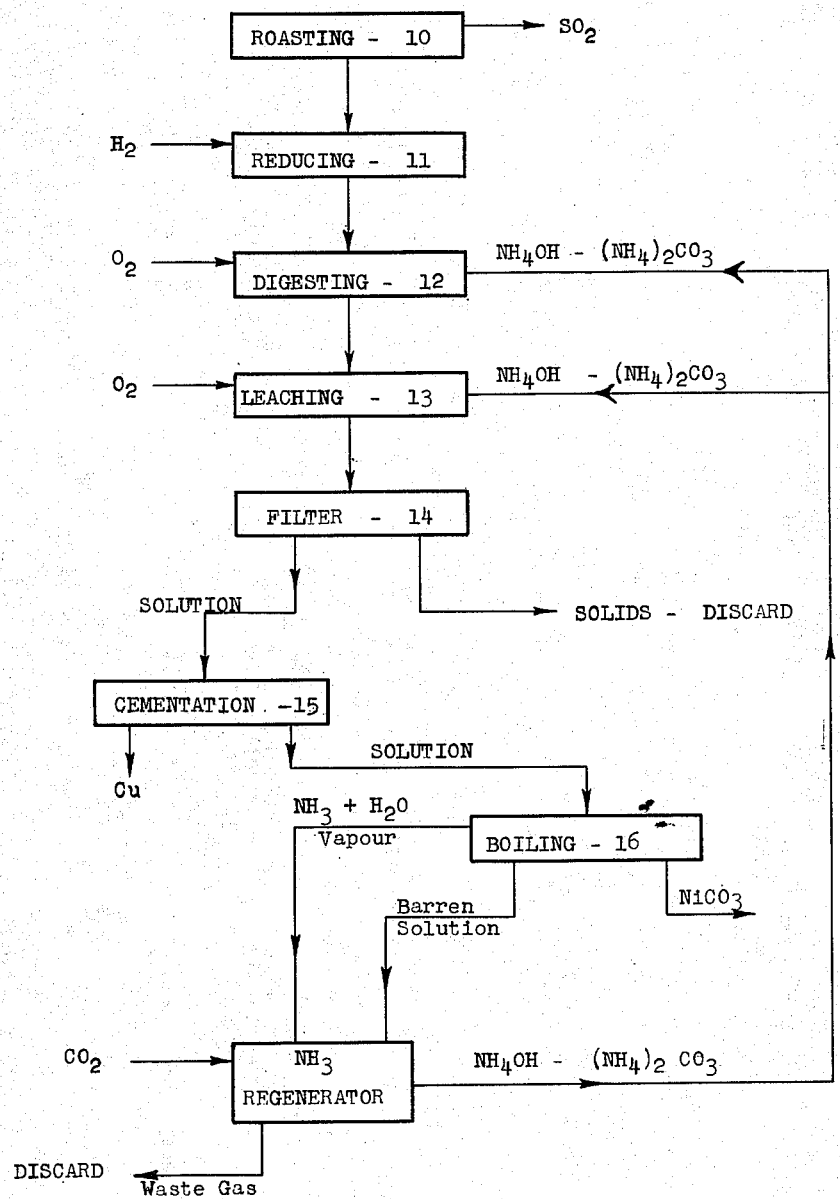

2,616,781

UNITED STATES PATENT OFFICE 2,616,781

TREATMENT OF NICKELIFEROUS OXIDE CONCENTRATES FOR RECOVERY OF NICKEL VALUES THEREFROM

Frank Arthur Forward, Vancouver, British Columbia, Canada, assignor to Sherritt Gordon Mines Limited, Toronto, Ontario, Canada, a corporation of Ontario Application December 17, 1948, Serial No. 65,798

6 Claims. (Cl. 23—61)

This invention relates to a process for the treatment of nickeliferous oxide ore or concentrate for the separate extraction therefrom of the nickel values together with the metal values associated therewith.

Processes for the extraction of the nickel values and other metal values associated therewith from nickeliferous oxide ore or concentrate material by leaching the material with an ammoniacal solution are relatively well known as exemplified by the disclosures of United States Patents Nos. 1,346,175; 2,290,313; 2,400,114; 2,400,115; 2,400,098; and 2,400,461.

In the main, the prior art on the subject is directed to extracting the nickel values from hydrated nickel-magnesium-silicate ores by subjecting the nickeliferous oxide material to a reducing roasting operation and thereafter leaching the reduced material with an ammonia-ammonium carbonate solution.

If iron is present in the starting material, an important difficulty is encountered in the leaching step of the process, and if copper is present the recovery of the nickel from the leach solution is complicated.

An important object of this invention is to provide a process for the extraction and separate recovery of nickel values from nickeliferous ore, concentrate and/or matte containing either or both iron and copper.

A further object of the invention is to provide an ammoniacal leaching method for nickeliferous oxide material containing iron by means of which the inhibiting effect of the iron on the velocity and efficiency of the leaching reaction may be substantially eliminated.

A further object of the invention is to provide a method by means of which the copper content of an ammoniacal leach solution containing nickel and copper values may be separated from the solution, leaving the nickel values in solution for separate recovery therefrom.

An understanding of the manner in which the above and other objects of the invention are attained may be had from the following description, reference being made to the accompanying drawing which is a flow sheet of a preferred embodiment of the process.

The method of extracting nickel values from nickeliferous oxide material containing iron of the present invention comprises, in general, the steps of exposing finely pulverized particles consisting essentially of nickeliferous oxides and iron oxide to a reducing atmosphere in a heated reaction zone whereby the nickel values of the material are reduced to metallic nickel, digesting the reduced material with an ammonia-ammonium carbonate solution in the ratio of about one part reduced material to about three parts solution, feeding an oxidizing gas into the mixture during the digesting step, continuing the digesting step for a period of time sufficient to convert substantially all the soluble iron present in the reduced material to an insoluble hydroxide of iron, diluting the digested mixture with ammonia-ammonium carbonate leach solution, agitating the diluted mixture in a reaction zone and feeding an oxidizing gas thereinto for a period of time sufficient to put into solution the major portion of the nickel values of the diluted mixture, separating the leached solids from the leach solution and recovering the nickel values from the solution.

The nickeliferous sulphide material may be in the form of an ore of the order of from 2% to 3% nickel; a concentrate of from about 7% to 17% nickel; or a matte containing nickel, copper, cobalt and iron.

The material is first reduced to a pulverulent form of the order of about minus 100 mesh standard Tyler screen such as by crushing followed by grinding.

In the case of nickeliferous sulphide ore and/or concentrate, the starting material is first roasted, such as by conventional hearth or "flash" oxidizing roasting methods, as indicated by the numeral 10 to convert it to oxide form and prepare it for the subsequent reducing and leaching steps.

The roasting step is preferably commenced at a temperature of about 500° C. and progressively heated, in stages, to a finishing temperature of from about 700° C. to about 800° C. to decompose any water or acid soluble nickel sulphates, after which the oxidized material is cooled.

If any soluble magnesium sulphate is present in the starting material or formed in the roasting step it is desirable to remove it by water washing the calcine before passing it to the reducing step.

In the case of a high copper, nickel sulphide matte as a starting material, such as might be produced by smelting, for example, if the ore contains precious metals, it is preferred to leach the roasted matte with dilute sulphuric acid, about 10% $H_2SO_4$, to separate out the bulk of the copper content as copper sulphate in which form it is in ideal condition for the recovery of electrolytic copper by electrolysis using insoluble anodes.

Care is taken throughout the roasting step to avoid any fusion or incipient fusion of the particles, which would interfere with the subsequent leaching operation, such as by continuous rabbling and relatively close temperature control.

The roasted calcine is reduced in a reducing chamber 11 in an atmosphere of hydrogen to convert the oxides to a reduced calcine in which the nickel, copper and cobalt are present in metallic form while the bulk of the iron remains as iron oxide. As found in the subsequent leaching operation, the most satisfactory extraction of the nickel and associated metals is obtained when the reduction is conducted within the temperature range of from about 400° C. to about 600° C. with a preferred range of from about 480° C. to about 525° C. due to the progressively increasing rate of reduction of iron to metallic iron as the temperature of the reducing chamber is increased above 525° C.

The ratio of hydrogen to water vapour in the reducing chamber may vary over a relatively wide range, for example, from 20:80 to 80:20 and a very satisfactory reduction is obtained. It is preferred to maintain the ratio of hydrogen to water vapour about 70:30.

The pulverulent calcine is charged into a closed reduction chamber wherein it is heated to and maintained at a temperature of from about 480° C. to about 525° C., during which period it is actively agitated, such as by rabbling or stirring, and each particle is exposed to the reducing action of a stream of hydrogen. Other reducing agents may be employed but it is found that hydrogen is the most effective agent at low temperatures. When hydrogen is used as the reducing agent the atmosphere in the reducing chamber consists of hydrogen and water vapor. The hydrogen may flow in a closed circuit from a storage tank to the reduction chamber and thence through a condensor to remove the water formed in the reducing reaction on its return to the storage tank.

The product of the reducing chamber is a light, pulverulent, reduced calcine consisting essentially of metallic nickel, metallic copper, metallic cobalt, and a minor amount of metallic iron, the bulk of the iron being present as iron oxide. It is found that in insuring the reduction of all the nickel to metallic form a minor amount of iron is also reduced to metallic form. Unless converted into an insoluble form, this metallic iron would tend to interfere with the velocity and efficiency of the subsequent leaching step. The bulk of the iron in the form of ferrous oxide is insoluble in the ammonia-ammonium carbonate leaching solution.

It has been found that the reducing operation should be conducted at a temperature below 525° C. for above this temperature the ferrous iron reduces rapidly to metallic iron which is soluble in the leach solution and tends to inhibit the efficient extraction and recovery of the nickel. Also, the higher hydrogen to water ratios induce reduction of ferrous oxide to metallic iron. Thus, it is preferred to maintain a relatively low reducing temperature to minimize the formation of metallic iron.

It has been found further that the hydrogen consumption in the reducing step is of the order of from about 4000 to about 5000 cubic feet of hydrogen per ton of starting material. However, if powdered coke to the extent of about 5% by weight is mixed with the charge to the reducing chamber the hydrogen consumption is reduced to about 1300 cubic feet per ton of starting material. Thus, it is possible to effect important savings in the hydrogen used in the reducing chamber by mixing a solid reducing agent such as coke with the roasted calcine charge to that chamber. The most satisfactory percentage of reducing agent to be added to the charge may be readily determined by experiment.

Any heat generated during the reducing reaction may be used to advantage to supplement the heat required in the operation of the process.

The presence of iron in the reduced calcine tends to complicate the leaching step. While the invention is independent of theoretical considerations, it may be that the iron alloys with nickel during the reducing reaction and this iron-nickel alloy is of low solubility in the ammoniacal leach solution, or it may be that the reduced iron causes passivation or coating of the nickel metal particles. Whatever may be the action of the iron, it is found that when metallic iron is present in the reduced calcine, the extraction of nickel in the leaching step is slow and inefficient.

It is found that the problem encountered by the presence of iron in leaching the reduced calcine of iron is overcome by digesting the reduce calcine with ammonia-ammonium carbonate leach solution prior to the actual leaching step, such as a digester 12. The digestion appears to provide conditions under which the metallic iron present is preferentially attacked by a corrosion process and is converted to a soluble ferrous complex. The ferrous complex, in turn, is oxidized, converted to insoluble ferric hydroxide and is thus precipitated from the leach solution. When the iron is corroded and precipitated, the inhibiting effect disappears and the metallic nickel is quite readily dissolved by the ammoniacal leach solution.

It is found that at a temperature of from 20° C. to 25° C., the oxygen dissolved in the pulp appears to react with the iron rather slowly and forms a tightly adhering insoluble oxide film on the iron and nickel particles which interferes with the dissolution of the nickel by the ammonia leach solution. As the pulp mixture is heated above normal room temperature, however, the oxygen dissolved in the pulp reacts rapidly with the iron, forming a soft film which breaks away from the particles to produce a soft, flocculent ferric hydroxide precipitate which does not interfere in any way with the leaching. As the temperature is increased, the reaction proceeds more rapidly but the solubility of the oxygen in the leach solution is reduced. Consequently, the temperature of the digesting step is maintained within that range within which the reaction proceeds most rapidly with maximum dissolution of oxygen in the pulp mixture.

It is found that the most satisfactory digesting procedure is to mix the reduced calcine with a portion of the ammonia-ammonium carbonate solution used in the subsequent leaching step of the process in the ratio of about three parts leach solution, by weight, to each part reduced calcine, and gently agitate the mixture in the presence of oxygen or oxygen enriched air, at a temperature below 70° C., and preferably within the range of from about 35° C. to about 40° C. until substantially all the soluble metallic iron has been converted to an insoluble ferric hydroxide.

With the iron in the form of a flocculent ferric hydroxide precipitate, it does not in any way interfere with the normal solubility of the nickel in the ammonia-ammonium carbonate leach solution and the pulp is ready for the actual leaching operation. The nickel in the reduced calcine is in metallic form and it must be converted to the ionic form to enter the nickel oxide-ammonia-water complex and this requires the presence of oxygen in the leaching solution.

The pulp from the digesting stage is preferably leached in several stages 13, for example two, with the solids and the leach liquor passing in countercurrent. The pulp from the digesting step is diluted with leach solution from the second leaching stage to produce a pulp mixture containing about 5% solids, and charged into a leaching tank 13 wherein it is maintained at a temperature, preferably of the order of from about 30° C. to about 50° C. and under a pressure of from about 15 to 30 pounds per square inch and agitated by a stream of oxygen and ammonia. This first stage of the leaching operation is conducted to obtain as high a nickel content in the leach solution as economically practical, having regard to all the factors entering into the extraction, of course.

The leach solution from the first leaching stage, containing from about 12 to about 15 grams of nickel per litre, is passed for subsequent treatment for the separation and recovery of the nickel content. The pulp is passed to a second leaching tank, such as a pachuca tank, wherein it is leached at a temperature of from about 30° C. to about 50° C. under a pressure of from about 15 to 30 pounds per square inch and agitated by a stream of ammonia and oxygen. The pulp in this stage comprises an 8% ammonia-8% ammonium carbonate solution containing about 5% solids. The leached solids from this stage may be discharged, filtered, washed and discarded and the leach solution passed to the first stage. It is found that when oxygen is used about 96% of the nickel in the starting material is recovered in the leach solution, with a leaching time of about two hours. Using atmospheric air for agitation under the same leaching conditions, about 70% of the nickel is recovered in the leach solution after leaching for about five hours.

It is found that by conducting the digesting and leaching operations in the manner described, recoveries up to about 98% of the nickel and about 90% of the copper in the original starting material may be obtained in the leach solution. Any cobalt in the starting material behaves in practically the same manner as the nickel and is reduced to metal, dissolved by the ammonia-ammonium carbonate leach solution and accompanies the nickel in the leach solution.

The leach solution, containing from about 12 to 15 grams of nickel per litre, from the first leaching stage is an ammoniacal solution containing in addition to the nickel, substantially all the copper and cobalt values contained in the feed material to the digesting step. It is substantially free from iron but may contain soluble sulphates formed in the original roasting operation and not reduced in the reducing operation.

The leach solution may be treated by any one of several methods for the separate recovery of the nickel and the metals associated therewith. I have found that a very convenient and inexpensive separation may be effected by precipitating the copper as copper cement and thereafter boiling the solution to drive off the ammonia and precipitate the nickel as nickel carbonate.

The copper may be separated conveniently from the filtrate from the leaching step by cementation with nickel powder. Specifically, the leach solution from the first stage of the leaching operation is thickened and filtered in a filter 14 to remove the solids. The filtrate is heated to a temperature of from 40° C. to 75° C. and agitated in a cementation tank 15 while adding nickel powder until all the copper has been precipitated from the solution. The copper remains as an insoluble precipitate as long as there is a slight excess of nickel powder and a free ammonia content of about 8% or more in the solution and may be readily separated from the solution by filtration. The copper is recovered in the form of sponge copper containing an excess of nickel. This may be marketed as recovered or it may be refined and the copper cast in marketable shapes, the nickel being returned to the process.

The ammoniacal filtrate from the copper cementation step contains the nickel and cobalt values. A very convenient method of recovering the nickel and cobalt is to pass the filtrate to a boiling stage 16 wherein it is boiled, such as by flash boiling, to drive off ammonia and water until the nickel and cobalt precipitate as hydrated carbonates of nickel and cobalt.

The vapor from the boiling step may be passed to an ammonia regenerator 17 wherein the ammonia is recovered and the ammonia-ammonium carbonate leach solution is replenished and returned to the leaching and digesting steps of the process. The solids consisting essentially of hydrated nickel carbonate are separated from the barren solution 24 and may be marketed as such or the nickel content may be converted by conventional methods into other marketable forms. The barren solution may be passed to the ammonia regenerating step.

The nickel extraction and recovery method of the present invention possesses a number of important advantages. The temperature of the reducing step may be controlled to inhibit the reduction of iron but it is found to be necessary to reduce a minor amount of iron to metallic iron in order to ensure the substantially complete reduction of the nickel content of the oxide material to metallic nickel. The digesting step overcomes the problem hitherto associated with the presence of iron in the nickeliferous material and is very easily and inexpensively operated to serve the dual purpose of converting the ammonia soluble iron into insoluble ferric hydroxide and prepare the nickeliferous material for the leaching step. By conducting the digesting step with mild agitation in the presence of oxygen and the leaching step under pressure and agitating the mixture with oxygen, the nickel is put into solution quickly and with an extremely high extractive efficiency.

It will be understood that the term "essentially" used hereinabove and in the appended claims is intended to mean that nickel and iron values are included with and form an essential part of the original starting material, although they may constitute only a minor percentage of the material, and the material may contain, and usually does contain, greater or smaller percentages of other metal values.

What I claim as new and desire to protect by Letters Patent of the United States is:

1. The method of extracting nickel values from nickeliferous oxide material containing iron which comprises the steps of exposing finely pulverized particles consisting essentially of nickeliferous oxides and iron oxide to a reducing atmosphere in a heated reaction zone whereby the nickel values of the material are reduced to metallic nickel, digesting the reduced material with an ammonia-ammonium carbonate solution in the ratio of about one part reduced material to about three parts solution, feeding an oxygen bearing oxidizing gas into the mixture during the digesting step and continuing the digesting step for a period of time sufficient to convert substantially all the soluble iron present in the reduced material to an insoluble hydroxide of iron, diluting the digested mixture with ammonia-ammonium carbonate leach solution, agitating the diluted mixture in a reaction zone and feeding an oxygen bearing oxidizing gas thereinto for a period of time sufficient to put into solution the major portion of the nickel values of the diluted mixture, separating the leached solids from the leach solution, and recovering the nickel values from the solution.

2. The method of extracting nickel values from nickeliferous oxide material containing iron which comprises the steps of exposing finely pulverized particles consisting essentially of nickeliferous oxides and iron oxide to an atmosphere of hydrogen in a reaction zone maintained at a temperature within the range of from about 400° C. to about 600° C. whereby the nickel values of the material are reduced to metallic nickel, digesting the reduced material with an ammonia-ammonium carbonate solution in the ratio of about one part reduced material to about three parts solution, feeding an oxygen bearing oxidizing gas into the mixture during the digesting step and continuing the digesting step for a period of time sufficient to convert substantially all the soluble iron present in the reduced material to an insoluble hydroxide iron, diluting the digested mixture with ammonia-ammonium carbonate leach solution, agitating the diluted mixture in a reaction zone and feeding an oxygen bearing oxidizing gas thereinto for a period of time sufficient to put into solution the major portion of the nickel values of the diluted mixture, separating the leached solids from the leach solution, and recovering the nickel values from the solution.

3. The method of extracting nickel values from nickeliferous oxide material containing iron which comprises the steps of intimately mixing finely pulverized material consisting essentially of nickeliferous oxides and iron oxides with a pulverized reducing agent, exposing the mixture to reaction with hydrogen in a reaction zone maintained at a temperature within the range of from about 480° C. to about 525° C. whereby the nickel values in the material are reduced to metallic nickel, digesting the reduced material with an ammonia-ammonium carbonate solution in the ratio of about one part reduced material to about three parts solution, feeding an oxygen bearing oxidizing gas into the mixture during the digesting step and continuing the digesting step for a period of time sufficient to convert substantially all the soluble iron present in the reduced material to an insoluble hydroxide of iron, diluting the digested mixture with ammonia-ammonium carbonate leach solution, agitating the diluted mixture in a reaction zone and feeding an oxygen bearing oxidizing gas thereinto for a period of time sufficient to put into solution the major portion of the nickel values of the diluted mixture, separating the leached solids from the leach solution, and recovering the nickel values from the solution.

4. The method of extracting nickel values from nickeliferous oxide material containing iron which comprises the steps of exposing finely pulverized particles consisting essentially of nickeliferous oxides and iron oxide to a reducing atmosphere in a reaction zone maintained at a temperature within the range of from about 400° C. to about 600° C. whereby the nickel values of the material are reduced to metallic nickel, mixing the reduced material with ammonia-ammonium carbonate solution to form a pulp mixture containing about one part reduced material to about three parts solution, digesting the pulp mixture in a reaction zone maintained at a temperature within the range of from about 20° C. to about 70° C., agitating and feeding an oxygen bearing oxidizing gas into the pulp mixture for a period of time sufficient to convert substantially all the iron present in the pulp mixture to an insoluble hydroxide of iron, diluting the digested mixture with ammonia-ammonium carbonate leach solution, agitating the diluted mixture in a reaction zone and feeding an oxygen bearing oxidizing gas thereinto for a period of time sufficient to put into solution the major portion of the nickel values of the diluted mixture, separating the leached solids from the leach solution, and recovering the nickel values from the solution.

5. The method of extracting nickel values from nickeliferous oxide material containing iron which comprises the steps of exposing finely pulverized particles consisting essentially of nickeliferous oxides and iron oxide to an atmosphere of hydrogen in a reaction zone maintained at a temperature within the range of from about 400° C. to about 600° C. whereby the nickel values of the material are reduced to metallic nickel, digesting the reduced material with an ammonia-ammonium carbonate solution in the ratio of about one part reduced material to about three parts solution, feeding an oxygen bearing oxidizing gas into the mixture during the digesting step and continuing the digesting step for a period of time sufficient to convert substantially all the soluble iron present in the reduced material to an insoluble hydroxide of iron, diluting the digested mixture in a reaction zone maintained at above atmospheric temperature and pressure with ammonia-ammonium carbonate solution to form a pulp mixture containing about 5% solids, feeding an oxygen bearing oxidizing gas into and agitating the pulp mixture for a period of time sufficient to put into solution the major portion of the nickel values of the pulp mixture, separating the leached solids from the pulp mixture, and recovering the nickel values from the solution.

6. The method of extracting nickeliferous oxide material containing iron and copper values which comprises the steps of exposing finely pulverized particles consisting essentially of nickel, copper and iron oxides to a reducing atmosphere in a heated reaction zone whereby the nickel and copper values of the material are reduced to metallic nickel and copper, digesting the reduced material with an ammonia-ammonium carbonate solution in the ratio of about one part reduced material to about three parts solution, feeding an oxygen bearing oxidizing gas into the mixture during the digesting step and continuing the digesting step for a period of time sufficient to convert substantially all the soluble iron present in the reduced material to an insoluble hydroxide of iron, diluting the digested mixture with ammonia-ammonium carbonate leach solution, agitating the diluted mixture in a reaction zone and feeding an oxygen bearing oxidizing gas thereinto for a period of time sufficient to put into solution the major portion of the nickel values of the diluted mixture, separating the leached solids from the leach solution, and separating and separately recovering the copper and nickel values from the solution.

FRANK ARTHUR FORWARD.

REFERENCES CITED

The following references are of record in the file of this patent:

UNITED STATES PATENTS

| Number | Name | Date |
|---|---|---|
| Re. 21,335 | Van Es | Jan. 23, 1940 |
| 298,149 | Wright | May 6, 1884 |
| 788,443 | Waterbury | Apr. 25, 1905 |
| 1,382,361 | Hybinette | June 21, 1921 |
| 1,487,145 | Caron | Mar. 18, 1924 |
| 1,592,306 | Lienhardt | July 13, 1926 |
| 2,068,296 | Lausberg | Jan. 19, 1937 |
| 2,168,542 | Van Es | Aug. 8, 1939 |
| 2,400,115 | Hills | May 14, 1946 |

OTHER REFERENCES

"A Comprehensive Treatise on Inorganic and Theoretical Chemistry," vol. 15, 1936 ed., pp. 21–22, Longmans, Green & Co., N. Y.